Figure 1:
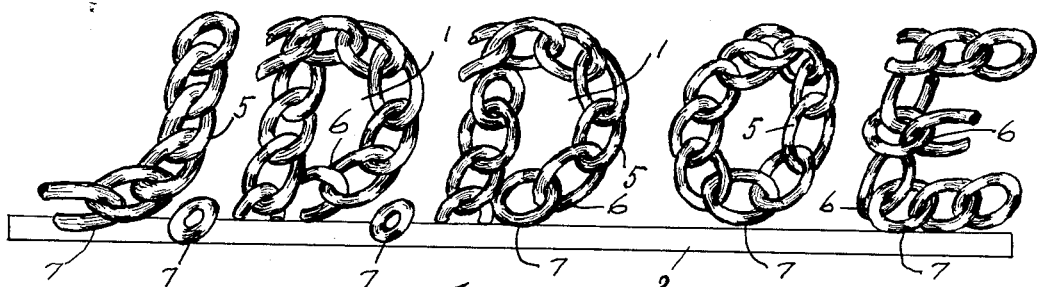

Feb. 28, 1956 J. D. COOPER 2,736,089
METHOD OF MAKING SIGNS OF CHAIN
Filed March 16, 1953

INVENTOR.
John Dewitt Cooper
BY Chas. Denegre
Attorney.

United States Patent Office 2,736,089
Patented Feb. 28, 1956

---

2,736,089

METHOD OF MAKING SIGNS OF CHAIN

John Dewitt Cooper, Jasper, Ala.

Application March 16, 1953, Serial No. 342,553

2 Claims. (Cl. 29—460)

This invention relates to a method of maaking signs of chains. The invention has for its main object to form of chain, letters, numerals, ciphers, arms, initials, crowns, symbols, artistic designs and the like.

Further objects are to provide such chain structures that will be highly satisfactory for the purpose intended, easy to manufacture, attractive in appearance, and extremely durable.

Other objects and advantages will appear from the drawing and description.

Figure 2:
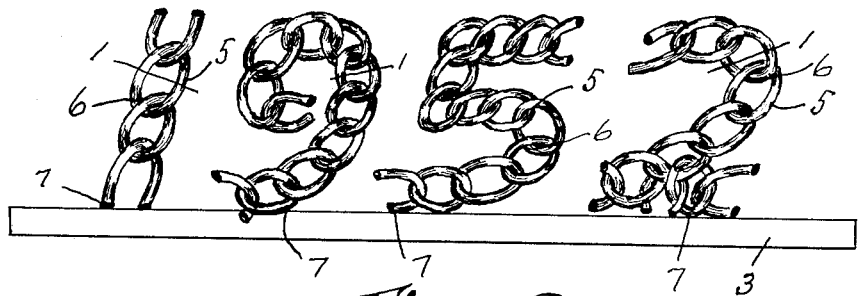

By referring generally to the drawing it will be observed that Fig. 1 is an elevational view of a name made of chain according to the present invention; Fig. 2 is an elevational view of a date made of chain according to the present invention; and Fig. 3 is an elevational view of an animal made of chain according to the present invention.

Similar reference numerals refer to similar parts throughout the several views.

Figure 3:
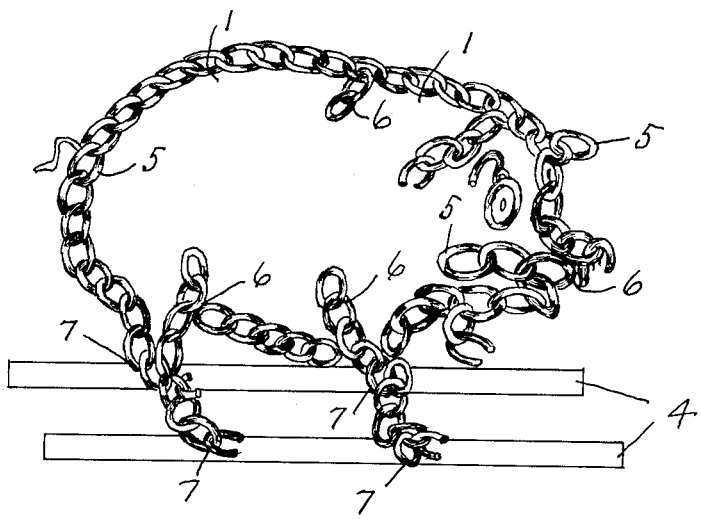

Referring to the drawing in detail it will be seen that the method consists of taking ordinary metal chain 1 and placing same on a flat level surface in the shape of a name as shown in Fig. 1, or date as shown in Fig. 2, or design as shown in Fig. 3, and provide a suitable metal supporting member as indicated by 2, 3 and 4, and then spot weld all the links 5 where they make contact with each other as at 6 and where they make contact with the supports as at 7. Then the structure is painted any desired color.

From the foregoing it will appear that a great variety of names, dates, and designs may be made by use of the method.

The structures may be made of any kind of metal chain adapted for being spot welded. Also the structures may be made in different sizes and capacities, depending on how and where to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. An improved method of forming letters, ciphers, numerals, initials, arms, symbols, and designs, and the like by placing parts of metal chain upon a flat surface in shapes of letters, ciphers, numerals, initials, arms, symbols and designs and then spot welding the chain links together where they make contact with each other, then attach by spot welding the thus assembled chain parts to a supporting metal member, then painting same.

2. An improved article of manufacture consisting of forming letters, ciphers, numerals, initials, arms, symbols, and designs, and the like by placing parts of metal chain upon a flat surface in shapes of letters, ciphers, numerals, initials, arms, symbols and designs and then spot welding the chain links together where they make contact with each other, then attach by spot welding the thus assembled chain parts to a supporting metal member, then painting same.

References Cited in the file of this patent

UNITED STATES PATENTS

| | | |
|---|---|---|
| 449,356 | Thomson | Mar. 31, 1891 |
| 627,542 | Stafford | June 27, 1897 |
| 1,533,239 | Eschholz | Apr. 14, 1925 |

FOREIGN PATENTS

| | | |
|---|---|---|
| 529,686 | Great Britain | Nov. 26, 1940 |

OTHER REFERENCES

Rigid Chain Products, pamphlet published in 1932 by Atlantic Welding and Manufacturing Corp., 896A 165th Street, Jamaica, N. Y.